United States Patent

Sherman et al.

[11] 3,940,769
[45] Feb. 24, 1976

[54] BINAURAL AUDITORY PRESENTATION APPARATUS

[75] Inventors: Samuel Mark Sherman, Moorestown; Leman Goldman, Jr., Pennsauken, both of N.J.

[73] Assignee: RCA Corporation, New York, N.Y.

[22] Filed: Jan. 21, 1974

[21] Appl. No.: 434,926

[52] U.S. Cl............ 343/113 R; 340/16 R; 343/16 M
[51] Int. Cl.²..................... G01S 3/72; G01S 9/22
[58] Field of Search.......... 343/16 M, 113 R, 7 ED; 340/16 R

[56] References Cited
UNITED STATES PATENTS

| | | | |
|---|---|---|---|
| 1,470,733 | 10/1923 | Hayes | 340/16 R |
| 1,510,792 | 10/1924 | Merritt | 343/113 R |
| 1,788,522 | 1/1931 | Horton | 343/113 R |
| 2,018,463 | 10/1935 | Muchow | 343/16 M |
| 2,416,155 | 2/1947 | Chubb | 343/16 M |
| 2,524,180 | 10/1950 | Schuck | 343/113 R |
| 3,626,416 | 12/1971 | Rabow | 343/113 R |
| 3,665,380 | 5/1972 | Stover | 343/113 R |

Primary Examiner—Maynard R. Wilbur
Assistant Examiner—G. E. Montone
Attorney, Agent, or Firm—Edward J. Norton; Joseph D. Lazar; Michael A. Lechter

[57] ABSTRACT

An apparatus for presenting radar target return signals having a spectrum of frequency components in a binaural audible form whereby an operator can detect a target or a plurality of simultaneous unresolved targets, determine the direction of each target relative to the radar antenna axis, and identify the type and motion of each target using only his auditory sense. The apparatus utilizes a filter to ensure that all frequency components of the return signal from each target have the same relative time of arrival at the two ears, thus binaurally localizing each target.

5 Claims, 3 Drawing Figures

BINAURAL AUDITORY PRESENTATION APPARATUS

Background of the Invention

1. Field of the Invention

This invention relates to binaural auditory presentation of radar or sonar returns to a trained operator. More specifically, the present invention is concerned with the binaural auditory presentation of data from moving targets or targets whose external parts are in relative motion.

2. Description of the Prior Art

Conversion of radar returns into an audible form for presentation to trained operators is a known technique. The audible signal is obtained by detecting or demodulating the received radio-frequency target returns. The operator listens to the audio signal through a loud speaker or a pair of earphones. In the prior art, both earphones are connected in parallel and carry the same signal. With training and experience, the operator can learn to detect and identify various types of moving targets by the characteristic modulations. The radar-derived audio "signatures" of helicopters, moving ground vehicles, moving personnel, and other targets often resemble their ordinary acoustic sounds. However, the operator cannot determine the position of a target within the radar beam relative to the antenna axis from the audio signals alone. Nor, can he resolve and individually locate and identify a plurality of targets within the radar beam and within the same range resolution cell.

Direction-finding receivers such as disclosed in U.S. Pat. No. 3,626,416 to Gerald Rabow, issued Dec. 7, 1971, have binaurally presented a beacon signal to an operator to determine the direction of the beacon signal source. The direction-finding receivers utilize a pair of antennas to impart a phase difference in a beacon signal of a particular radio frequency as received at the two individual antennas. The antennas are critically spaced to create a phase difference between the signals at the antennas related to the angular position of the beacon signal source with respect to a reference direction perpendicular to the line joining the two antennas. The radio-frequency beacon signals as received by the two antennas are converted to audio-frequency signals maintaining the same phase relationship. The audio signals are presented to the respective ears of the operator. The operator's auditory facilities interpret the difference in the time of arrival of the signals at his ears as a direction by what is termed binaural localization. Thus, the phase difference imparted to the binaural signals causes a difference in the time of arrival at the operator's ears related to the angular position of the beacon source for beacon signals of the particular frequency to which the system is tuned.

However, direction-finding receivers, as described above, are operable for only a single chosen beacon frequency and are, therefore, not compatible with radar target return signals which may be frequency-distributed; i.e., have discrete frequency components or a wide continuous spectrum of frequencies, as will be explained. Furthermore, they present signals of the same loudness or intensity to both ears, whereas binaural localization, to be fully effective, requires both a time-of-arrival difference and a difference in loudness between the signals reaching the two ears.

In general, radar return signals are amplitude-modulated or phase-modulated or both, whenever target motion of one or more of the following types occurs: (1) translational motion of the entire target having a component toward or away from the radar; (2) rotational motion of the entire target, unless the target is symmetrical about the axis of rotation; (3) relative motion of external parts of the target, such as arm and leg motions of a human target, rotation of aircraft propellers, or vibrations caused by a running motor. The modulations generate new radio-frequency components in the return signal that are not present in the transmitted signal. The process of detection or demodulation converts these new radio-frequency components into corresponding audio-frequency components. The frequency of each audio component equals the difference between the radio frequency from which it was derived and the carrier frequency of the transmitted signal. The audio frequencies can be translated upward or multiplied or divided by a scale factor if desired, without changing the principles of this invention to be described. In practice, target characteristics and motions are usually complex and cause a wide spectrum of audio frequencies. Even if there is only one audio frequency component, it can have any frequency over a wide band depending on the target motion. Thus, each moving target return signal carries a modulation (which is converted to an audio "signatures") that is characteristic of the target type and motion.

The spread of radio frequencies due to target modulation is small as compared to the carrier or center frequency of the exploratory radar signal. Audio frequencies that can be binaurally localized by human ears are approximately between 30 and 1000 Hz. Radar frequencies are generally between 10 and 70,000 MHz, while a typical radar frequency is 1,300 MHz. See Skolnik, "Introduction to Radar Systems," published by McGraw Hill Book Company, Inc., New York, 1962, and Skolnik, "Radar Handbook," published by McGraw Hill Book Company, Inc., New York, 1970, for a detailed description of radar principles and systems.

In systems such as that disclosed in the above mentioned U.S. Pat. No. 3,626,416, the antennas are critically spaced with respect to each other so that, at the particular frequency of the beacon, there is a phase difference between the signals as received at the individual antennas (maintained in conversion to an audio frequency), whereby the operator can binaurally localize the beacon source. However, if the beacon signal is of a typical radar frequency and is modulated as in a radar return, so that modulation frequency sidebands are generated, the radio-frequency phase difference between the signals at the two antennas for each of the frequency components will be practically identical, in view of the negligible percentage differences in the radio-frequency component signals. Thus, the same phase difference between the two earphones will be preserved in the various audio-frequency signals.

A phase difference between two audio signals at the same frequency creates a proportional difference in the time of arrival of the respective signals at the ears ($\Delta t$) equal to the phase difference in degrees ($\phi$) divided by the product of 360° and the audio frequency ($f$), in accordance with the formula $\Delta t = \phi/(360f)$. Therefore, since each frequency component has the same phase, each will have a different time-of-arrival differential at the two ears, and the operator will have the sensation that each is coming from a different direction.

In order for a binaural signal containing a spectrum of frequency components to be perceived as coming from a single location, each frequency component of the signal must have approximately the same time-of-arrival differential at the ears, as opposed to the same phase. Systems such as disclosed in the aforementioned U.S. Pat. No. 3,626,416, therefore, are not compatible with radar return signals, which are usually frequency distributed.

Moreover, such systems as described in U.S. Pat. No. 3,626,416 make no provision for differing the intensity of the signal at the two ears in accordance with their relative position with respect to the target.

Summary of the Invention

The present invention provides a means of presenting all frequency components of a signal spectrum from each particular target of a plurality of targets with essentially the same time-of-arrival differential at the two ears.

Further, the present invention presents the pair of audio signals to the ears with a greater intensity on the side closer to the target.

More specifically, the present invention is a binaural auditory presentation device comprising means for receiving sum and difference signals, derived from doppler-shifted or modulated target signals as received at a first and a second input means, the sum and difference signals having multiple frequency components characteristic of the target. Filter means modify the amplitude and phase of each frequency component of the difference signal. The filtered difference signal is then vectorially summed with the sum signal to produce a first audio output signal and is inverted and summed with the sum signal to produce a second audio output signal. The transfer function of the aforementioned filter means is such that each frequency component of the first and second audio output signals representing a particular target maintains substantially the same time-of-arrival differential, the time-of-arrival differential being related to the off-axis angle of the corresponding target and an amplitude ratio that is also a function of the off-axis of the target. The two output signals are binaurally presented to the operator, one signal to each ear.

Detailed Description of a Preferred Embodiment

Figure 1:
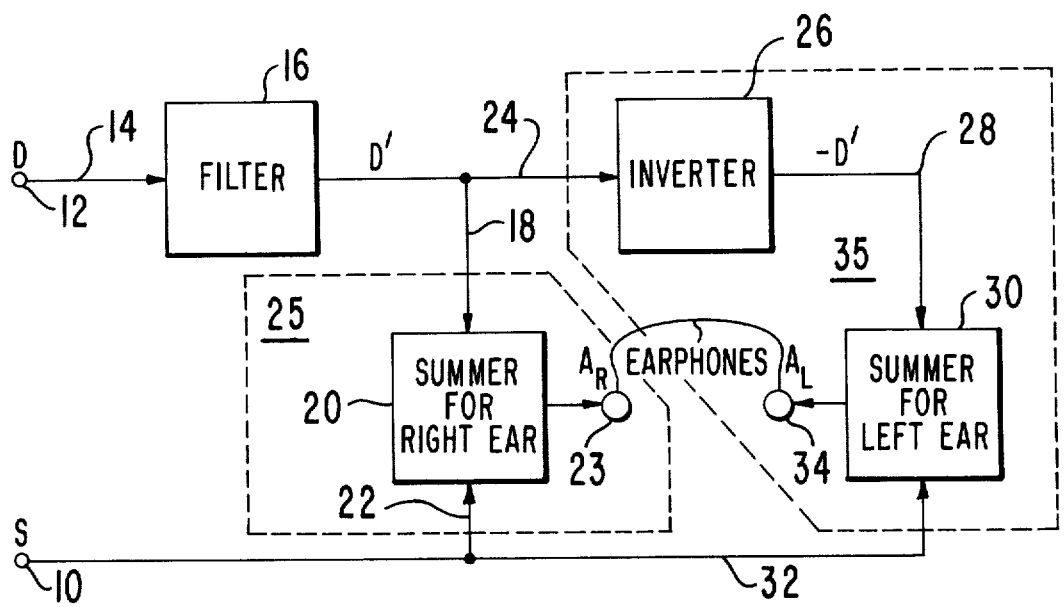
FIG. 1 is a block diagram of a system embodying the present invention.

In many radar applications, only one dimensional component of the direction of the return signals, for instance the azimuth or elevation component, is of interest. For example, in a battlefield surveillance radar, information concerning the azimuth component alone is needed. If binaural presentations are desired for more than one angular component, the invention herein described must be implemented, it should be understood, for each component separately, and two operators are accordingly required.

In analogy to the ears of the human auditory facilities, a radar system must, in order to produce binaural signals, have at least a first and a second receiving means with a reference axis or direction for receiving target return signals, such as two antennas or a single antenna with at least two beams as in a conventional monopulse radar system. The antenna axis serves as a reference axis. The target signals received by the individual receiving means are either processed through "left" and "right" receivers, or are combined into a sum signal and a difference signal, then processed through a sum receiver and difference receiver.

Monopulse radar, such as above described, is well known in the art. A more complete description can be found in "Introduction to Monopulse," by D. R. Rhodes, published by McGraw Hill Book Company, Inc., New York, 1959, and in many other publications.

The radio frequency sum and difference signals (right and left beam signals) are converted to audio frequency signals by well-known methods of detection, demodulation, or heterodyning.

The frequencies of primary interest to the system are those between 30 and 1000 Hz. Binaural qualities deteriorate rapidly with increasing frequency for frequencies above 1000 Hz, although such audio frequencies do improve the fidelity of the audio system. Frequencies below approximately 30 Hz are not usually considered audible. Thus, the useful audio bandwidth for binaural localization comprises frequencies between 30 and 1000 Hz.

The highest audio-frequency component that can be obtained at the output of a radar is half the pulse repetition frequency (PRF) of the radar system. Any higher-frequency components that may be present in the target return signal are "folded over" and cannot be distinguished from those that lie between zero and half the PRF. PRF's are typically high enough to provide signals within the useful audio bandwidth. For example, PRF's of 500 to 2,000 pps are common and higher PRF's can usually be provided for special modes (such as auditory presentation) if needed. Furthermore, some radars have continuous-wave (CW) transmissions rather than pulsed transmissions. In such CW radars, there is practically no upper limit to the audio-frequency spectrum that can be preserved.

The audio-frequency sum and difference signals must then be converted into two binaural signals, i.e. a first and a second audio-frequency output signal, one for each ear. For binaural localization of a signal source, the difference in time-of-arrival of the two binaural signals at the ears should be approximately proportional to the sine of the angle between the target direction and the antenna axis. The binaural signal to the ear on the side nearer the target should precede the signal to the ear further from the target. Appropriate constants can be chosen to establish the sensitivity or "scale" of the binaural effect. It should be noted that an "expanded scale" can be obtained whereby the apparent angle of the target can be made much larger than the true angle, by suitable choice of the constants.

As previously noted, a further prerequisite for binaural localization of a frequency-distributed signal is that each individual frequency component have approximately the same time-of-arrival differential at the two ears.

The signal on the side nearer the target should also be stronger in amplitude than the other signal by a ratio that increases with the angle of the target from the antenna axis.

Reference is now made to FIG. 1, which is a block diagram of one embodiment of a device for presenting the audio signals binaurally in accordance with the above stated requirements for binaural localization of the target. Input means such as terminals 10 and 12, respectively, receive the audio frequency sum signal S and difference signal D, as generated by a conventional radar system. The difference signal, as received at terminal 12, is applied to a suitable filter 16 over path 14. Filter 16 in the preferred form of the invention must meet certain operating properties as will be described, noting, nevertheless, that any suitable filter will serve the general operating requirements. The output signals D' of the filter 16 are applied over path 18 to summer 20, suitably a resistor network or a two-input operational amplifier (op amp) summer. Summer 20 also receives, as an input signal, the audio sum signal S over path 22. The filtered difference signal D' and sum signal S are therein vectorially summed by summer 20. The resultant sum is a first audio output signal $A_R$, which is applied to (right) earphone 23. Thus, summing means 20 and earphone 23 comprise a first presentation means 25. The filtered difference signal D' is also applied over path 24 to a suitable phase inverter 26, such as an op amp inverter or a transformer, and is therein inverted. The inverted signal, −D', is applied over path 28 to summer 30, suitably a two-input op amp summer or a resister network. Summer 30 is also receptive of the sum signal S, over path 32. The output signal of summer 30 is the resultant sum of the vectorial addition of the inverted filtered difference signal −D', and the sum signal S and is a second audio output signal $A_L$ which is applied to (left) earphone 34. Thus, inverter 26, summer 30, and earphone 34 comprise a second presentation means 35.

Figure 2:
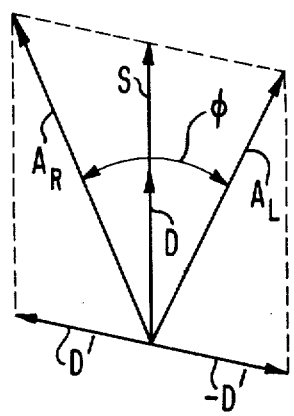
FIG. 2 is a phasor diagram illustrating the phases and amplitudes of the signals of concern.

The operation of the preferred embodiment of the present invention will be described in conjunction with the phasor diagram of FIG. 2. In monopulse radar, the sum signal S and difference signal D are in phase with each other when the target is on the "positive" side of the antenna axis and 180° out of phase when the target is on the "negative" side of the axis. In general, the choice of the "positive" side is arbitrary, but for the purpose of illustration, it is assumed here that "positive" is right and "negative" is left. In the particular case illustrated in FIG. 2, the target is to the right of the antenna axis. Thus, merely presenting the sum signal S plus the difference signal D (S + D) to the right ear and the sum signal minus the difference signal (S − D) to the left ear, will not maintain the requisite difference in time-of-arrival for binaural localization. Filter 16, therefore, is used to modify the amplitude and phase of each frequency component. The resultant phasor is generally indicated as D' in FIG. 2. Inverter 26 inverts D', indicated in FIG. 2 as phasor −D'. The phasors D' and −D', are vectorially summed with the sum signal S to produce the resultant audio output signals $A_R$ and $A_L$, respectively. The transfer function of filter 16 is chosen so as to produce the requisite time-of-arrival differential and amplitude ratio between the audio output signals $A_R$ and $A_L$.

Such a transfer function should be linear with constant parameters to permit linear superposition of signals simultaneously received from a multiplicity of targets or sources.

As described above, the audio output signals $A_R$ and $A_L$ are the vectorial sum and difference of the sum signal s and the filtered difference signal D'. That is:

$$A_R = S + D' \quad (1)$$
$$A_L = S - D' \quad (2)$$

The ratio of the $A_L$ and $A_R$ signals defined by equations (1) and (2) may be expressed in a useful form based on the following definitions:

$$d = \frac{D}{S}$$

$$d' = \frac{D'}{S}$$

$f$ = frequency
$H(f)$ = transfer function of the filter = $D'/D$ $$r = \left| \frac{A_R}{A_L} \right| = \text{amplitude ratio of } A_R \text{ and } A_L$$

$$\Delta t = \frac{\phi}{2\pi f} = \text{time-of-arrival differential}$$

by which $A_R$ precedes $A_L$ $\phi$ = phase of $A_R$ relative to $A_L$

The ratio of the audio output signals $A_R$ and $A_L$ may thus be expressed as follows:

$$\frac{A_R}{A_L} = \frac{S + D'}{S - D'} = \frac{1 + d'}{1 - d'} = re^{j\phi} \quad (3)$$

Further, and since $$\Delta t = \frac{\phi}{2\pi f},$$

it follows that:
$$\phi = 2\pi f \Delta t \quad (4)$$

Therefore, $$\frac{A_R}{A_L} = \frac{1 + d'}{1 - d'} = re^{j2\pi f \Delta t} \quad (5)$$

Also, $$H(f) = \frac{D'}{D} = \frac{d'}{d} \quad (6)$$

or
$$d' = d\, H(f) \quad (7)$$

Substituting in (5)

$$\frac{1 + d\, H(f)}{1 - d\, H(f)} = re^{j2\pi f \Delta t} \quad (8)$$

from which the ideal filter transfer function is obtained:

$$H(f) = \frac{1}{d} \cdot \frac{re^{j2\pi f \Delta t} - 1}{re^{j2\pi f \Delta t} + 1} \quad (9)$$

In order to determine whether the ideal filter transfer function, expressed by equation (9), can be realized physically, it is noted and should be appreciated that $\Delta t$ should be a function only of the target angle, whereas $H(f)$ depends only on the parameters of the filter and cannot be a function of the target angle. Therefore, the ideal filter transfer function and consequently the required relationship between the right and left audio signals cannot be realized exactly, but must be a compromise of the dilemma.

However, for a finite frequency band, the ideal filter transfer function can be approximated by physically realizable filters to the degree necessary for satisfactory binaural perception, as will be illustrated.

To produce a binaural effect in which the apparent angle perceived by the listener equals the true angle of the target, the time-of-arrival differential $\Delta t$ should theoretically be proportional to the sine of the target angle from the radar axis. However, in practice the apparent angle as perceived by the operator need not equal the true angle. For example, the apparent angle may be magnified. Once the relations between the apparent angle and the true angle have been determined by computation or test, the former can be converted to the latter by a calibration curve. Thus, it is essential only that the time-of-arrival differential $\Delta t$ be a monotonically increasing odd function of the true angle (and therefore a monotonically increasing odd function of $d$), and that it be zero when the target is on the axis (i.e., when $d = 0$). Further, $\Delta t$ should be essentially independent of frequency over the band of audio frequencies contained in the signals (30 – 1000 Hz). However, moderate dependence on frequency can be tolerated in human binaural perception.

The amplitude ratio $r$ has less rigid requirements than $\Delta t$ over the usual range of audio frequencies available from a radar. The essential requirement is that $r$ be a monotonically increasing function of $d$, with $r = 1$ when $d = 0$, and that the values of $r$ for equal but opposite values of $d$ be reciprocals of each other.

Figure 3:
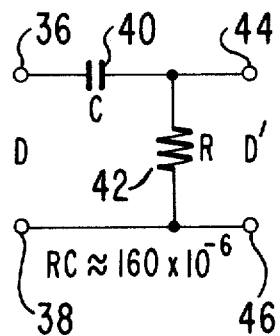
FIG. 3 is a schematic of a preferred filter used in the system of FIG. 1.

One filter that meets the above stated relationships is shown in FIG. 3. The difference signal D is applied through input terminals 36 and 38 across a series combination of capacitor 40, of value C, and resistor 42, of value R. The output signal is taken from terminals 44 and 46 across resistor 42.

As well known in the art, the response of the filter at a particular frequency $f$ can be expressed as:

$$D' = D\, H(f) = D\, \frac{j2\pi fRC}{1 + j2\pi fRC} \quad (10)$$

Thus, the audio output signals $A_R$ and $A_L$ of the binaural apparatus at frequency $f$ can be expressed as:

$$A_R = S + D\, \frac{j2\pi fRC}{1 + j2\pi fRC} \quad (11)$$

$$A_L = S - D\, \frac{j2\pi fRC}{1 + j2\pi fRC} \quad (12)$$

where $S$ is the component of the sum signal at the same frequency $f$. Again, as indicated above, the symbol $d$ represents the ratio of the difference and sum signals at the particular direction of the target, $$d = \frac{D}{S} \quad (13)$$

Thus, $d$ is a measure of the target angle with respect to the antenna axis. The amplitude ratio $r$, between the audio output signals in terms of $d$ can be computed to be:

$$r = \left|\frac{A_R}{A_L}\right| = \sqrt{\frac{(2\pi fRC)^2(1+d)^2 + 1}{(2\pi fRC)^2(1-d)^2 + 1}} \quad (14)$$

The phase difference $\phi$ between the audio output signals $A_L$ and $A_R$ can be expressed as:

$$\phi = \tan^{-1} \frac{-4\pi fdRC}{1 + (1-d^2)(2\pi fRC)^2} \quad (15)$$

The difference in time-of-arrival, $\Delta t$, of the audio output signals at the ears can be expressed as:

$$\Delta t = \frac{\phi}{2\pi f} = \frac{1}{2\pi f}\tan^{-1}\frac{-4\pi fdRC}{1 + (1-d^2)(2\pi fRC)^2} \quad (16)$$

when $\phi$ is expressed in radians. With proper choice of RC, $\Delta t$ can be made substantially independent of frequency.

It is clear from equation (16) that the time-of-arrival differential $\Delta t$ created by such a filter varies by only a small percentage as a function of frequency over the frequency band of interest (30 – 1000 Hz). It is zero when $d$ is zero, its absolute value increases monotonically with that of $d$, and it has the same sign as $d$.

Moreover, equation 14 establishes that the amplitude ratio $r$ maintained by such a filter is unity when $d = 0$, increases monotonically with $d$, and further is converted to its reciprocal when $d$ is replaced by $-d$.

Thus, it is seen that such a filter maintains the requisite relationships for binaural localization over the band of frequencies of interest. Further, it has been found by calculation that for constant frequency, $\Delta t$ is very nearly proportional to the sine of the off-axis angle, as required for accurate angular localization.

Table I shows a sample tabulation from the above equations, for both a small (0.04) and a moderately large (0.5) value of the D/S amplitude ratio, $|d| = |D/S|$, with RC chosen as $160 \times 10^{-6}$. In a typical monopulse radar $|d| = 0.04$ when the target is about one-fiftieth beamwidth from the antenna axis and $|d| = 0.5$ when the target is about one-quarter beam width from the antenna axis. In Table I, the frequencies were chosen in approximately equal logarithmic steps, so that the ratio of each frequency to the one above it is about 0.7.

TABLE I

| TABULATIONS FROM EQUATIONS (14) and (16) | | | | |
|---|---|---|---|---|
| | Large Angle $|d|= 0.5$ | | Small Angle $|d|= 0.04$ | |
| Freq., Hertz | Ampl. Ratio | $\Delta t$, $\mu$sec. | Ampl. Ratio | $\Delta t$, $\mu$sec. |
| 1000 | 1.6 | 84 | 1.04 | 6.4 |
| 700 | 1.4 | 107 | 1.03 | 8.4 |
| 500 | 1.2 | 128 | 1.02 | 10.2 |
| 350 | 1.1 | 143 | 1.01 | 11.4 |
| 250 | 1.06 | 150 | 1.00 | 12.1 |
| 175 | 1.03 | 154 | 1.00 | 12.4 |
| 125 | 1.015 | 156 | 1.00 | 12.5 |
| 88 | 1.009 | 158 | 1.00 | 12.6 |
| 62 | 1.005 | 158 | 1.00 | 12.6 |
| 44 | 1.002 | 158 | 1.00 | 12.6 |

It is seen from Table I that for frequencies up to about 500 Hz, $\Delta t$ does not vary as a function of frequency by more than about 10% above or below a mean value. The 10% deviation is within the moderate departure from the theoretical requirement that $\Delta t$ be independent of frequency that can be tolerated by the human ear. The mean value of $\Delta t$ is a functiion of $d$, which, in turn, is a measure of target angle from the antenna axis. It is known from tests of binaural hearing that a $\Delta t$ as small as 10 microseconds can be detected by a human listener. Thus, binaural localization is realizable for the time differentials established by the filter shown in FIG. 3.

In many radars the PRF is below 1000 pulses per second (PPS), so that the audio signals do not extend above 500 Hz. An audio bandwidth extending from the lowest audible frequency up to 500 Hz. or even considerably less is usually ample to identify characteristic "signatures" of various types of targets. Therefore, the simple filter with $RC = 160 \times 10^{-6}$ is adequate for use with many radars.

Moreover, it is known that in the higher frequency region, the ears depend more on amplitude ratio than on time differential for binaural localization, and although in the frequency region above 500 Hz. $\Delta t$ established by such a filter decreases more rapidly, the ratio $A_R/A_L$ at those frequencies begins to become significant. Thus, such a filter can be used even when the audio bandwidth extends above 500 Hz.

In any case, $\Delta t$ can be made to more closely approach independence of frequency by lowering the value of RC in the filter shown in FIG. 3. This is disadvantageous in that the magnitude of D' (and therefore of d') will be attenuated as RC is lowered, and therefore, the sensitivity of angle perception will be decreased. However, the attenuation can be compensated for, and the sensitivity restored, by suitable amplification of D before filtering or of D' after filtering. Unfortunately, while amplification following attenuation restores the desired signal level, it also increases the noise. Furthermore, too small a value of RC will tend to suppress the variation of $r$ with $d$. Therefore, RC should not be made smaller than necessary.

Alternately, $\Delta t$ can be made to more closely approach independence of frequency by utilizing a more complex filter that more closely achieves the ideal transfer function.

An additional feature of the present invention provides a means to differentiate between and identify a plurality of heretofore unresolvable targets present at different angles within the radar beam. Each individual target, in effect, is described by a characteristic phasor diagram, similar to that in FIG. 2, whereby the auditory facility of the operator can separate them. The characteristic sound of each target also helps the operator to correlate and identify the targets. The process is the same as the process by which a blindfolded person can identify and localize music, conversations, and other sounds emanating simultaneously from different parts of a room.

It should be appreciated by those skilled in the art that the present invention can easily be adapted for localization of voice-modulated communications. Particular utility can be found in a space environment, whereby the radio communications equipment of the astronauts' space suits may be made to simulate natural binaural location. Similar utility may be found in any environment not conductive to natural speech communication.

It is apparent from the foregoing description that the present invention provides a particularly advantageous apparatus for binaural presentation of signals. It will be understood that the above description is of an illustrative embodiment of the present invention, and that the invention is not limited to the specific form shown. Modification may be made in the design and arrangement of the elements without departing from the spirit of the invention.

What is claimed is:

1. In a system wherein an audio-frequency sum signal and an audio-frequency difference signal are derived from frequency-distributed radio-frequency (RF) signals from at least one remote source, said RF signals being received at a plurality of reception means having a specified reference axis, a binaural auditory presentation apparatus comprising:

input means for receiving said sum signal and said difference signal;

filter means receptive of said difference signal for modifying the amplitude and phase of each frequency component of said difference signal;

first presentation means receptive of said sum signal and said filtered difference signal for deriving from said sum signal and said filtered difference signal a first audio-frequency output signal representative of said RF signals from said remote sources;

means, receptive of said filtered difference signal, for inverting said filtered difference signal; and second presentation means, receptive of said sum signal and said inverted filtered difference signal, for deriving from said sum signal and said inverted filtered difference signal a second audio-frequency output signal representative of said RF signals from said remote sources;

said filter means modifying the amplitude and phase of each of said frequency components of said difference signal such that;

each of the frequency components of said first output signal representative of the RF signals from each respective individual remote source maintain substantially the same time differential between a presentation by said first presentation means and a presentation by said second presentation means of the corresponding frequency component of said second output signal, where each of said time differentials is a function of the position of said respective individual remote source with respect to said reference axis and each of said time differentials is of such a duration as to be binaurally discernable and such that the amplitude ratio of each corresponding frequency component of said first and second audio-frequency output signals representative of the RF signals from each respective individual remote source is a function of the position of said respective individual remote source with respect to said reference axis.

2. The system of claim 1 wherein:

said time differential between presentation by said first and said second presentation means is a monotonically increasing function of the position of said respective individual remote source with respect to said reference axis whereby said time differential is zero when said respective individual remote source is located on said reference axis; and said amplitude ratio is a monotonically increasing function of the position of said respective individual remote source with respect to said reference axis whereby said ratio equals unity when said respective individual remote source is located on said reference axis and said ratio is reciprocally related for individual remote sources equidistant from but on opposite sides of said reference axis.

3. The apparatus of claim 2, wherein:
said filter means comprises a resistance, R, and a capacitance, C;
said difference signal being applied across said resistance and capacitance in series;
said filtered difference signal being taken from across said resistance.

4. The apparatus of claim 3, wherein:
$RC = 160 \times 10^{-6}$ second.

5. The apparatus of claim 1, wherein:
said first presentation means comprises summing means receptive of said sum signaal and said filtered difference for vectorially summing said sum signal with said filtered difference signal; and
said second presentation means comprises;
summing means, receptive of said inverted filtered difference signals and said sum signal, for vectorially summing said inverted filtered difference signal with said sum signal.

* * * * *

UNITED STATES PATENT OFFICE
CERTIFICATE OF CORRECTION

PATENT NO. : 3,940,769

DATED : Feb. 24, 1976

INVENTOR(S) : Samuel Mark Sherman and Leman Goldman, Jr.

It is certified that error appears in the above-identified patent and that said Letters Patent are hereby corrected as shown below:

Column 8, line 11, change "$\phi$-" to --$\phi$ =--

Column 12, line 4, change "signaal" to --signal--

Signed and Sealed this eleventh Day of May 1976

[SEAL]

Attest:

RUTH C. MASON
*Attesting Officer*

C. MARSHALL DANN
*Commissioner of Patents and Trademarks*